United States Patent [19]

Palnitkar

[11] Patent Number: 4,547,389
[45] Date of Patent: Oct. 15, 1985

[54] METHOD OF MAKING SWEET PICKLES

[75] Inventor: Madhav P. Palnitkar, Southfield, Mich.

[73] Assignee: Vlasic Foods, Inc., Bloomfield, Mich.

[21] Appl. No.: 554,680

[22] Filed: Nov. 23, 1983

[51] Int. Cl.[1] .................. A23L 1/218; A23L 1/212
[52] U.S. Cl. .................................. 426/639; 426/397
[58] Field of Search ............ 426/639, 615, 281, 270, 426/49, 397

[56] References Cited

U.S. PATENT DOCUMENTS

| | | | |
|---|---|---|---|
| 1,703,730 | 2/1929 | Fraisse | 426/639 |
| 1,704,367 | 3/1929 | Moore | 426/639 |
| 1,829,932 | 11/1931 | Hey | 426/615 |
| 1,906,295 | 5/1933 | Wickenden | 426/639 |
| 2,066,574 | 1/1937 | Pilorz et al. | 426/639 |
| 2,182,829 | 12/1939 | Thomas | 426/639 |
| 2,326,407 | 8/1943 | Steinwand | 426/639 |
| 2,785,071 | 3/1957 | Mathews | 426/639 |
| 3,578,466 | 5/1971 | Luckmann et al. | 426/615 |
| 4,350,711 | 9/1982 | Kahn et al. | 426/639 |
| 4,361,589 | 11/1982 | Wauters et al. | 426/639 |
| 4,390,550 | 6/1983 | Kahn et al. | 426/639 |

OTHER PUBLICATIONS

S. V. Poultney, *Food*, Jan. 1949, pp. 19–22.
Pickle and Sauce Making, 1962, 2nd Ed., Binsted et al., London, Food Trade Press.
Commercial Fruit and Veg. Products, Cruess–3rd Ed., McGraw Hill, 1948.
Complete Course in Canning, 9th Ed., 1969, Lopez, Canning Trade.
Elements of Food Technology–Desrosier, Avi Publ., 1977.

*Primary Examiner*—Steven Weinstein
*Attorney, Agent, or Firm*—Banner, Birch, McKie & Beckett

[57] ABSTRACT

A method of producing sweet pickles is provided wherein perforated pickle stock is covered with an acidified syrup containing a high concentration of sucrose.

18 Claims, No Drawings

METHOD OF MAKING SWEET PICKLES

TECHNICAL FIELD

The present invention is directed to the production of pickled vegetable or fruit products. More particularly, the present invention is directed to a method of producing sweet pickled vegetable or fruit products.

BACKGROUND OF THE INVENTION

The traditional method of making sweet pickles is a process known as a tank sweetening. In the tank sweetening method, pickle stock is sweetened by immersion in a series of progressively more concentrated sugar solutions until the concentration of the sugar solids in the pickle is raised to about 40° Brix (22° Baume, 40% by weight). In a typical process, pickle stock is first placed in a tank containing a syrup that is 30% sugar by weight. After one day, diffusion has caused the sugar concentration to equalize in the liquid phase and the pickle at about 15% by weight. The liquid phase is then either replaced with a higher concentration syrup or withdrawn, mixed with additional solid sugar to raise the concentration, and then returned to the tank. By a series of such step-by-step increases in sugar concentration, the desired 40° Brix sweet pickles can be produced in a period of about 3 to 15 days.

Tank sweetening on a commercial scale has several disadvantages. First, the multi-step increases in sugar concentration requires that a manufacturer employ multiple tanks. Furthermore, the process produces large quantities of excess syrup. Finally, tank sweetening is undesirable because of the numerous sanitary and safety hazards associated with handling the syrup (e.g., contamination and spillage).

It would be extremely desirable if sweet pickles could be produced by a one-step immersion in a syrup, particularly if the syrup and pickles could be combined directly in a retail container, such as a glass jar or other package. Placing whole pickles in highly concentrated syrups, however, would be expected to significantly shrink the pickle stock irreversibly due to the extremely high osmotic pressure between the concentrated sugar syrup and the high water content of the pickle stock. The water content of cucumbers, for example, is above 90% by weight. Water migrates from the pickle stock into the surrounding liquid phase much more rapidly than the sugar can migrate across the membrane of the cucumber. The net effect is that the pickle stock shrinks substantially and irreversibly.

A method of producing a moderately sweet pickle in a single immersion step has been developed. In this method, the pickle stock is first pricked with a commercial pricking panel and then immersed in a mixture of corn syrup and vinegar containing about 60% corn syrup solids by weight. The resulting pickle has a sweetener content of only about 30° Brix (30% by weight) or less and is not, therefore, desirable to many consumers. Furthermore, even with the pricking, the pickles begin to show shrinking at a 60% corn syrup solids concentrations. This one-step method, although advantageously simplified, does not produce the sweet pickle with a 40° Brix sweetener concentration as desired by many consumers.

Commercial scale production of pickles generally employs liquid sweetener solutions, such as dissolved sucrose or corn syrup. The maximum concentrations of solids in sucrose solutions is generally about 66% by weight. Higher concentrations can solidify under handling or processing conditions and an enormous effort is required to remove the solidified sugar from containers or equipment. Commercial scale production methods, therefore, are generally limited to solutions of no more than 66% sucrose by weight.

Thus, it is readily apparent that it be desirable to the art to develop a method of producing sweet pickles that reduces process steps, yet still produces a sweet pickle with a sweetener content greater than 30° Brix, and also reduces the danger of high-concentration sucrose solutions solidifying during processing or handling.

SUMMARY OF THE INVENTION

It is an object of the present invention to provide a method of making sweet pickles.

Another object of the present invention is to provide a method of making sweet pickles with a sweetener content greater than 30° Brix.

It is also an object of the present invention to produce sweet pickles by immersing them in only a single syrup.

Still another object of the present invention is to provide a syrup that does not solidify under normal processing conditions and can supply all the sweetener and acid required in a sweet pickle by a single immersion in the syrup.

Yet another object of the present invention is to provide a method of producing sweet pickles by immersing pickle stock in a single, highly concentrated sugar syrup without significant shrinkage or damage to the pickle stock.

These objects of the present invention, as well as other objects apparent to those of skill in the art, are achieved by the following embodiments of the present invention.

In one embodiment, the present invention provides a method of producing sweet pickles comprising: (a) providing an acidified sucrose syrup, said syrup containing at least about 70% sucrose by weight, and about 1% to about 7% acid as acetic acid by weight; (b) covering whole pickle stock with said syrup, said pickle stock being sufficiently perforated through the outer membrane of said pickle stock so that the osmotic pressure generated by said syrup does not cause significant shrinkage of said pickle stock; and (c) allowing said sucrose and said acetic acid to reach equilibrium concentration in said pickle stock and surrounding liquid phase by diffusion to produce sweet pickles substantially free of significant shrinkage.

In another embodiment, the present invention provides a method of producing sweet pickles comprising: (a) providing an acidified sucrose syrup, said syrup comprising at least about 70% sucrose by weight, and from about 1% to about 7% acid as acetic acid by weight; (b) providing whole pickle stock, the outer membrane of said pickle stock being sufficiently perforated so that the osmotic pressure generated by covering said pickle stock with said syrup will not cause significant shrinkage of said pickle stock; (c) covering said pickle stock with said syrup in a retail container; (d) closing said retail container containing said pickle stock and said syrup; and (e) allowing said sucrose and said acetic acid to reach equilibrium concentration in said pickle and surrounding liquid phase by diffusion to produce sweet pickles substantially free of significant shrinkage.

DETAILED DESCRIPTION OF THE INVENTION

The present invention provides a method of making sweet pickles with a sweetener content greater than 30° Brix, and preferably about 35°-40° Brix or more. Surprisingly, applicant has discovered that sweet pickles can be prepared by a method comprising essentially covering perforated pickle stock with a highly concentrated, acidified sucrose syrup. The present invention is significantly advantageous over prior art methods in that it requires only a single immersion of pickle stock in a sugar syrup, avoids damage to the pickle stock normally expected from high-concentration sugar syrups, avoids the production of excess syrup, and obviates the sanitation and safety problems presented by handling waste or recycled syrups. Applicant's discovery is particularly unexpected since it was believed in the art that (a) the high-concentration sugar syrups employed in the present invention would irreversibly shrink and damage the pickle stock, even perforated pickle stock, and (b) such highly concentrated sugar solutions could not be handled at normal processing temperatures without solidifying.

As indicated above, the present invention employs an acidified sucrose syrup to cover the pickle stock. Applicant has discovered that a highly concentrated sugar syrup that does not solidify at processing temperatures and does not cause significant shrinkage of perforated pickle stock can be produced if the sugar selected is sucrose (instead of, for example, corn syrup) and the syrup is acidified. The acidified sucrose syrup employed in the present invention contains at least about 70% sucrose by weight and can range up to the maximum concentration at which solidification of sucrose becomes a problem, typically above about 85% by weight. Preferably, the acidified sucrose syrups employed in the present invention will have a sucrose concentration of about 75% to about 85% by weight, most preferably from about 78% to about 82%. In a particularly preferred embodiment, the sucrose concentration is about 80% by weight. The sucrose syrup is acidified with vinegar, typically an amount in the range of from about 1% to about 7% acid as acetic acid by weight. Preferably, the acetic acid concentration is from about 2% to about 6% by weight, and most preferably from about 3% to about 5% by weight. In one particular preferred embodiment, the acetic acid concentration is about 4% by weight.

The acidified sucrose syrup can be made in any conventional manner. A preferred method is to dissolve the sugar and the appropriate amount of water in a heated steam kettle with stirring to prevent charring. The acetic acid is preferably added towards the end of the sugar addition to reduce fuming of the acid.

The acidified sucrose syrup described above can be handled during processing without solidifcation, contrary to expectations for such a high concentration of sucrose. At 95° F. the acidified sucrose syrup is easily handled and, at ambient temperature, it only becomes viscous without solidifying. Although applicant does not wish to be bound by this theory, it is believed that the acetic acid hydrolyzes the sucrose into its components, glucose and fructose. Thus, solidification of the sucrose is substantially hindered. Acid concentrations within the ranges disclosed above, therefore, are necessary for the handling of the syrup in a commercial process and should be adjusted according to the individual needs by those of skill in the art. Applicant also believes that selection of sucrose is critical to the prevention of shrinkage of the pickle stock. Corn syrup, for example, contains higher molecular weight components that cannot migrate as quickly through the pickle's outer membrane, even with perforations. The hydrolyzed sucrose, however, has a comparatively lower average molecular weight and more readily migrates across the pickle's membrane.

The described acidified sucrose syrup is used to cover pickle stock to produce sweet pickles. The pickle stock can be any conventional vegetable or fruit that is made into a sweet pickle (e.g., cucumbers, cauliflower, peaches, pears, apricots, etc.). The preferred pickle stock, however, is cucumber pickle stock. While the present invention will at times be described in terms of its preferred embodiment, cucumber pickle stock, it is understood that the basic process is generally applicable by those of skill in the art to other vegetable or fruit pickle stock.

Cucumber pickle stock, also called salt stock, is well known in the art. Cucumber pickle stock is typically produced by allowing fresh cucumbers to ferment in a 6-10% salt solution for about 15 to 20 days. During this period, lactic acid bacteria convert sugar to lactic acid and the pH drops from about 7 to about 3.3. When it is desired to convert pickle stock into sweet pickles, the pickles are withdrawn from the salt solution and soaked in water until the salt content drops to the range of about 2 to 5%, generally about 4%. Any conventional cucumber pickle stock known in the art may be employed.

The pickle stock employed is whole (e.g.. not sliced or chopped). Because the membrane of the pickle stock remains substantially unbroken, applicant has found that it is critical to perforate the membrane to prevent damage to the pickle stock due to the osmotic pressure. It is to be understood that by perforation is meant the making of small diameter holes in the outer membrane. Preferably, the holes are not generally detectable by casual inspection with the naked eye. These perforations can be made by any method known to those of skill in the art. A relatively simple (and thus preferred) method of perforating the outer membrane in pricking the outer membrane with a needle. Commercially available pricking panels are particularly suited for large scale pricking of pickle stock. The length of the panels employed and the gauge of the needles on the panels can be readily determined by those of skill in the art.

The degree of perforation required can vary depending upon the pickle stock employed and the exact concentration of the sucrose in the acidified syrup. It is only necessary that the membrane be sufficiently perforated so that the osmotic pressure generated by the high concentration of sucrose in the syrup does not cause significant shrinkage. Significant shrinkage will irreversibly damage the pickle stock and make it undesirable to consumers. Significant shrinkage is typically about a 10% or more irreversible reduction in volume after about one month of storage. Preferably, the irreversible shrinkage is no more than about 5% by volume.

The perforated pickle stock is covered with the described acidified sucrose syrup. Generally, the syrup also contains spices to give the sweet pickle the desired flavor. The spices employed are well known in the art and selected by individual taste. The spices include, but are not limited to, oil of cassia, clove oil, pimento berry or leaf, lemon oil, orange oil, tarragon and the like.

In a particularly preferred embodiment of the present invention, the perforate pickle stock is placed into a retail container (e.g., a glass jar) covered with the acidified sucrose syrup containing the desired spices and capped employing conventional food processing techniques. Thus, the pickle stock can be converted to sweet pickles directly in the retail container which obviates the safety and sanitary problems associated with tank sweetening.

Once the perforated pickle stock is covered with the acidified sucrose syrup, diffusion begins. The sucrose and acetic acid diffuse into the pickle, while water and sale diffuse out of the pickle. The initial ratio of syrup to pickle stock in the container will govern the eventual equilibrium concentrations of the sucrose, acetic acid, water and salt. By volume, it is usually preferred to employ about 60 parts pickle stock per 40 parts syrup when the syrup contains about 80% sucrose and about 4% acid as acetic acid by weight. This proportion can be varied over a significantly wide range by those of skill in the art. It is preferred to employ the pickle stock and syrup in such a ratio that, after equilibrium concentrations have been established, the sucrose content of the sweet pickle is at least about 35% by weight, preferably about 38% to about 42%. The acetic acid concentration of the sweet pickle is preferably from about 1.5% to about 2.5% by weight. The surrounding liquid phase, composed of water which has defused out of the pickle stock and diluted syrup, has the same concentrations of sucrose and acetic acid as the sweet pickle. Generally, diffusion continues for about 3 to 4 weeks before sale of the pickles to permit the spices to fully flavor the pickled vegetable or fruit.

The following examples are presented for illustrative purposes and are not intended to limit the scope of the present invention.

EXAMPLE I

ACIDIFIED SUCROSE SYRUP

Approximately 1,200 lbs. of sucrose was dissolved in 30 gallons of water in a stainless steel steam kettle heated to about 180° F. The sugar was added one bag at a time (100 lbs./bag) with stirring to prevent charring. Towards the end of the sugar addition, 22 gallons of 30% acetic acid was added. This produced 150 gallons of acidified sucrose syrup containing 80% sucrose by weight and 4% acetic acid by weight. A mixture of spice emulsion containing clove oil, pimento berry, pimento leaf, oil of cassia, and lemon oil was then added to the syrup.

EXAMPLE II

PERFORATED PICKLE STOCK

Size 1 cucumber pickle stock (ca ½ to ¾ in. dia.) was desalted by soaking in water until a salt content of about 4 to 4½% by weight was reached. The desalted pickle stock was then run over three 10 ft. lengths of a commercially supplied pricking panel (Model LS-10; Simplicity Division, General Steel Indus.; Durand, Mich.). It was found that best results were achieved if the pricking panel was adjusted to have a slight incline in the direction of travel (ca 2° ele.) to facilitate contact between the cucumber pickle stock and the needles. Needles protruded about one-half inch from the panel and were approximately one inch apart. Pickle stock was run over the panels at a rate of approximately 3 linear feet/minute.

EXAMPLE III

PRODUCTION OF SWEET PICKLES

The pricked pickle stock of Example II was taken from the end of the pricking panels, packed into glass jars with a Solburn filler, and then passed to an inspection line where additional pickles were added as necessary. The jars containing the pricked pickle stock were filled with the acidified sucrose syrup of Example I by a positive flow briner, the jars flushed with steam, and then capped employing conventional equipment. The capped jars were pasteurized at approximately 165°–168° F. center temperature and then cooled. Each jar contained about 60 parts pickle stock and about 40 parts syrup, by volume.

Approximately 30 minutes after filling and capping, jars of pickles were examined to determine whether sufficient pricking of the outer membrane had occurred. The pickle stock pricked as described above did not show any significant shrinkage. As a control, unpricked cucumbers were also packed as described above and showed a 30% reduction in size in the 30 minute period. The entire contents (pickles and liquid phase) was ground up in a blender for analysis of the composition. Analysis showed 40% sugar, 2% acetic acid and 2½% salt, all by weight.

Approximately 2 to 3 weeks later, the jars of pricked pickles were examined and tasted. No significant shrinkage was observed and no substantial difference in flavor, texture or chemistry was found between the product produced by the above method and a 40° Brix sweet pickles produced by conventional tank sweetening methods.

While the invention has been described with reference to specific embodiments, it is not intended to limit the scope of the invention thereby, which is defined solely by the claims.

I claim:

1. A method for producing sweet pickles having a sweetener content of greater than 30° Brix comprising:
    (a) providing an acidified syrup, said acidified syrup initially containing at least about 70% sucrose by weight, and from about 1% to about 7% acid as acetic acid by weight;
    (b) covering whole pickle stock without any significant prior sweetening treatment with said syrup, said pickle stock being sufficiently perforated through the outer membrane of said pickle stock so that the osmotic pressure generated by said syrup does not cause significant shrinkage of said pickle stock; and
    (c) allowing the constituents of said acidified syrup to reach equilibrium concentration in said pickle stock and surrounding liquid phase by diffusion to produce sweet pickles substantially free of significant shrinkage and having a sweetener content of greater than 30° Brix.

2. The method of claim 1 wherein said pickle stock is whole cucumber pickle stock.

3. The method of claim 1 wherein the initial sucrose content of said acidified syrup is from about 75% to about 85% by weight and said acetic acid comprises from about 2% to about 6% by weight of syrup.

4. The method of claim 3 wherein said pickle stock is whole cucumber pickle stock.

5. A method of claim 1 wherein the initial sucrose content of said acidified syrup is from about 78% to about 82% by weight and said acetic acid comprises from about 3% to 5% by weight of said syrup.

6. The method of claim 5 wherein said pickle stock is whole cucumber pickle stock.

7. A method of claim 1 wherein said sweet pickles contain a sweetener content of between about 35° and about 40° Brix and about 1.5% to about 2.5% acid as acetic acid by weight after said equilibrium is established.

8. The method of claim 7 wherein said pickle stock is whole cucumber pickle stock.

9. A method of producing sweet pickles having a sweetener content of greater than 30° Brix comprising:
 (a) providing an acidified syrup, said acidified syrup initially containing at least about 70% sucrose by weight, and from about 1% to about 7% acid as acetic acid by weight;
 (b) providing whole pickle stock without any significant prior sweetening treatment, the outer membrane of said pickle stock being sufficiently perforated so that the osmotic pressure generated by covering said pickle stock with said syrup will not cause significant shrinkage of said pickle stock;
 (c) covering said pickle stock with said syrup in a retail container;
 (d) closing said retail container containing said pickle stock and said syrup; and
 (e) allowing the constituents of said acidified syrup to reach equilibrium concentration in said pickle stock and surrounding liquid phase by diffusion to produce sweet pickles substantially free of significant shrinkage and having a sweetener content of greater than 30° Brix.

10. The method of claim 9 wherein said pickle stock is whole cucumber pickle stock.

11. The method of claim 9 wherein said retail container is a glass jar.

12. The method of claim 11 wherein said pickle stock is whole cucumber pickle stock.

13. The method of claim 11 wherein the initial sucrose content of said acidified syrup is from about 75% to about 85% by weight and said acetic acid comprises from about 2% to about 6% by weight of said syrup.

14. The method of claim 13 wherein said pickle stock is whole cucumber pickle stock.

15. The method of claim 11 wherein the initial sucrose content of said acidified syrup is from about 78% to about 82% by weight and said acetic acid comprises from about 3% to about 5% by weight of said syrup.

16. The method of claim 15 wherein said pickle stock is whole cucumber pickle stock.

17. The method of claim 11 wherein said sweet pickles contain a sweetener content of between about 35° to about 40° Brix and about 1.5% to about 2.5% acid as acetic acid by weight after said equilibrium is established.

18. The method of claim 17 wherein said pickle stock is whole cucumber pickle stock.

* * * * *